(12) United States Patent
Schume et al.

(10) Patent No.: US 12,118,897 B2
(45) Date of Patent: Oct. 15, 2024

(54) AUGMENTED REALITY TUTORIAL GENERATION

(71) Applicant: INTERNATIONAL BUSINESS MACHINES CORPORATION, Armonk, NY (US)

(72) Inventors: Philipp Schume, Austin, TX (US); Shikhar Kwatra, Durham, NC (US); Craig M. Trim, Ventura, CA (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 16/522,223

(22) Filed: Jul. 25, 2019

(65) Prior Publication Data

US 2021/0027643 A1    Jan. 28, 2021

(51) Int. Cl.
| | | |
|---|---|---|
| *G09B 5/02* | (2006.01) |
| *G06F 16/23* | (2019.01) |
| *G06N 20/00* | (2019.01) |
| *G06T 11/00* | (2006.01) |
| *G09B 19/00* | (2006.01) |

(52) U.S. Cl.
CPC ............ *G09B 5/02* (2013.01); *G06F 16/2365* (2019.01); *G06N 20/00* (2019.01); *G06T 11/00* (2013.01); *G09B 19/003* (2013.01)

(58) Field of Classification Search
None
See application file for complete search history.

(56) References Cited

U.S. PATENT DOCUMENTS

| | | | |
|---|---|---|---|
| 9,349,100 B2 | 3/2016 | Kozloski et al. | |
| 2004/0133532 A1 | 7/2004 | Seitz et al. | |
| 2010/0250529 A1* | 9/2010 | Surendran | G06Q 30/02 715/745 |
| 2011/0279359 A1* | 11/2011 | McCarty | H04N 21/42203 345/156 |
| 2012/0122570 A1 | 5/2012 | Baronoff | |
| 2013/0117377 A1* | 5/2013 | Miller | G06F 3/017 709/205 |
| 2014/0067729 A1* | 3/2014 | Kozloski | G06N 7/005 706/12 |
| 2014/0171039 A1* | 6/2014 | Bjontegard | A63F 13/217 455/414.1 |
| 2014/0240349 A1* | 8/2014 | Tuukkanen | G06F 16/50 345/633 |

(Continued)

OTHER PUBLICATIONS

Z. Chen, "Early Implementation Experience with Wearable Cognitive Assistance Applications." In Proceedings of the 2015 workshop on Wearable Systems and Applications (WearSys '15). ACM, 33-38, 2015.

(Continued)

*Primary Examiner* — David H Chu
(74) *Attorney, Agent, or Firm* — Schmeiser, Olsen & Watts, LLP; Nicholas Welling

(57) ABSTRACT

A method, system and computer program product includes identifying, by one or more processors of a computer system, a relevant tutorial to a user using a machine learning ontology tree, and providing, by the one or more processors of the computer system, the identified relevant tutorial to an augmented reality device of the user.

18 Claims, 10 Drawing Sheets

(56) References Cited

U.S. PATENT DOCUMENTS

| | | | | |
|---|---|---|---|---|
| 2014/0310595 A1* | 10/2014 | Acharya | ............ | G06F 3/04842 |
| | | | | 715/706 |
| 2015/0162000 A1 | 6/2015 | Di Censo et al. | | |
| 2015/0248788 A1 | 9/2015 | Abovitz et al. | | |
| 2016/0134484 A1* | 5/2016 | Tanaka | ............ | H04L 41/22 |
| | | | | 345/633 |
| 2016/0283768 A1* | 9/2016 | Kounavis | ............ | G06V 10/761 |
| 2016/0307459 A1* | 10/2016 | Chestnut | ............ | G06F 3/011 |
| 2016/0314623 A1* | 10/2016 | Coleman | ............ | B23D 59/00 |
| 2017/0097236 A1* | 4/2017 | Bender | ............ | G06Q 30/016 |
| 2018/0060663 A1* | 3/2018 | Baskin | ............ | G09B 19/003 |
| 2018/0068577 A1* | 3/2018 | Javanbakht | ............ | H04N 7/152 |
| 2018/0174434 A1* | 6/2018 | Dyer | ............ | G08C 17/02 |
| 2018/0247123 A1* | 8/2018 | Harper | ............ | H04N 17/04 |
| 2019/0007819 A1 | 1/2019 | Marchiol et al. | | |
| 2019/0121522 A1* | 4/2019 | Davis | ............ | G06V 40/28 |
| 2019/0166030 A1* | 5/2019 | Chen | ............ | H04L 7/042 |
| 2019/0188326 A1* | 6/2019 | Daianu | ............ | G06N 3/08 |
| 2020/0035112 A1* | 1/2020 | Delaney | ............ | G06F 16/24578 |
| 2020/0064146 A1* | 2/2020 | Kitajima | ............ | G01C 21/3608 |
| 2020/0293778 A1* | 9/2020 | Elliott | ............ | G06F 3/0304 |
| 2020/0328933 A1* | 10/2020 | Wu | ............ | H04W 4/38 |
| 2021/0025727 A1* | 1/2021 | Barnes | ............ | G06T 19/006 |

OTHER PUBLICATIONS

K. Ha, "Towards wearable cognitive assistance." In Proceedings of the 12th Annual International Conference on Mobile Systems, Applications, and Services (MobiSys '14). ACM, 68-81, 2014.

L. Kalantari, "Using semantic web approach in augmented audio reality system for museum visitors." In Proceedings of the 13th international World Wide Web conference on Alternate track papers & posters (WWW Alt. 04). ACM, 386-387, 2004.

Mell, Peter et al.; "The NIST Definition of Cloud Computing;" National Institute of Standards and Technology; Special Publication 800-145; Sep. 2011; 7 pages.

* cited by examiner

AUGMENTED REALITY TUTORIAL GENERATION

TECHNICAL FIELD

The present invention relates to augmented reality. More specifically, the invention relates to systems and methods for generating tutorials for augmented reality based on ontology tree navigation.

BACKGROUND

Augmented reality is typically an interactive experience of a real-world environment where objects residing in the real world are enhanced by computer-generated information. Augmented reality is currently being implemented in gaming environments in which immersive experiences are created using augmented reality technology. However, Augmented reality is not limited to gaming and may be used to enhance the user experience in other applications. As augmented reality becomes more popular, the use of augmented reality to assist in the daily lives of people will expand.

SUMMARY

An embodiment of the present invention relates to a method, and associated computer system and computer program product. One or more processors of a computer system identify a relevant tutorial to a user using a machine learning ontology tree. The one or more processors of the computer system provide the identified relevant tutorial to an augmented reality device of the user.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Embodiments described herein will provide augmented reality (AR) guided tutorials to users in an efficient, and time saving manner. The present invention leverages machine learning, ontology trees, natural language processing techniques and artificial intelligence algorithms to automatically determine relevant tutorials that a user will be interested in and/or need at a given time. Embodiments described herein obtain, receive, or otherwise procure information and data from user devices, including AR devices, and from other data sources, such as historical data sources from other users. Embodiments analyze this information, learn from this information, and then develop learning trees, such as ontology tree. Embodiments described herein will identify a user's contextual situation and cognitive heuristics and navigate an ontology tree that is created and updated with feedback that includes relevant tutorials correlating to those situations.

Figure 1:
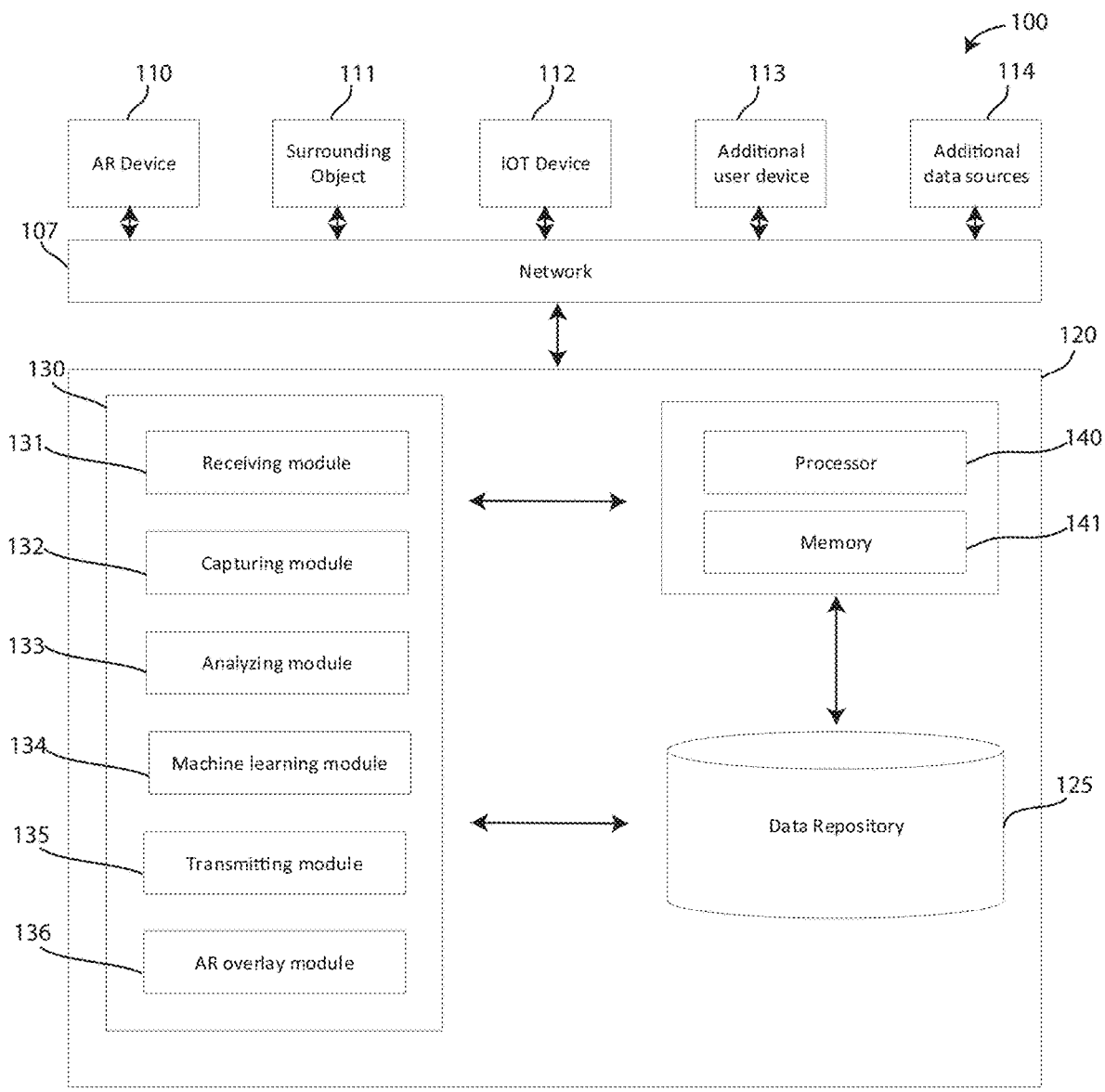
FIG. 1 depicts a block diagram of an augmented reality system, in accordance with embodiments of the present invention.

Referring to the drawings, FIG. 1 depicts a block diagram of an augmented reality system 100, in accordance with embodiments of the present invention. Embodiments of the augmented reality system 100 may be configured to perform at least three separate functions including: A) visual processing and ingestion of data pertaining to a user and their interactions; B) the usage of a machine learned ontology tree to detect a relevant tutorial; and C) the overlay of relevant tutorial information on a user's AR device. While the present description herein displays one or more exemplary embodiments of the augmented reality system 100 and the computer system 120, various other embodiments incorporating the concepts herein are contemplated.

The augmented reality system 100 is shown including an AR device 110, a surrounding object 111, an IOT device 112, an additional user device 113 and an additional data source 114 connected over a network 107 to a computer system 120. Each of the AR device 110, the surrounding object 111, the IOT device 112, the additional user device 113, and the additional data source 114 may each represent a plurality or a single one of the given element 110, 111, 112, 113, 114. Some or all of the AR device 110, the surrounding object 111, the IOT device 112, the additional user device 113, and the additional data source 114 may be interconnected to others of these devices. While FIG. 1 shows the AR device 110, the surrounding object 111, the IOT device 112, the additional user device 113, and the additional data source 114 directly connected to adjacent elements 110, 111, 112, 113, 114, any interconnection (e.g. non-adjacent) of elements 110, 111, 112, 113, 114 is contemplated. Further, while each of the elements 110, 111, 112, 113, 114 are shown as separate features of the augmented reality system 100, in some embodiments one or more of the elements 110, 111, 112, 113, 114 may be combined or contain overlapping structure and functionality (e.g. the AR device 110 may include functionality or features attributed in the present description to the additional user device 113 and vise versa).

Th AR device 110 may be a wearable glasses device, smart glasses device or headset. The AR device may be a mobile device, such as a mobile phone, or a smartwatch. The AR device 110 may be a contact lens, or any other wearable device that is connectable to the network 107 and may be used by a user to augment reality through visual or auditory means. The AR device 110 may include its own processor, computer system data storage capabilities or the like. In some embodiments, the AR device 110 may also connectable to a separate computer system having one or more processors to reduce the workload required of the AR device 110. In other embodiments, the AR device 110 may be connectable to the network 107 or other devices thereon, via WiFi® or Bluetooth® or the like.

The surrounding object 111 may be one or more objects that the user is interacting with. The surrounding object 111 may represent a location identifiable by the computer system 120 based on the information provided by the AR device 110. For example, the surrounding object 111 may be the road, land and general location when a user is driving in a vehicle. As another example, the surrounding object 111 may be a vending machine or other point of sale mechanism or location. The surrounding object 111 may be an item that was purchased by the user, either in an opened or unopened state. The surrounding object 111 may further be a vehicle, boat, or other mechanical device, that the user is viewing. The surrounding object 111 may be a household appliance, a technological device, or the like. The surrounding object 111 may represent one or more pieces of information that is analyzable by the computer system 120 so that the computer system 120 can determine a situation that the user might need or desire a tutorial or guide.

The internet of things (IOT) device 112 may be any device that is connectable to the network 107 that can provide information or data to the computer system 120. For example, the IOT device 112 may be a household IOT appliance, an alarm system, a home speaker system, a lighting system, a camera, a device having a GPS system or location sensing system, or the like. The IOT device 112 may be a device that is in a public space or at a private business or home. The IOT device may be many IOT devices that are providing relevant information to the computer system 120 that enable the computer system 120 to determine tutorials that a user may be interested in viewing. The IOT device 112 may be configured to understand a user contextual situation and may include determining user gestures, which may involve gathering a user's inputs from an accelerometer sensor inculcated with magnetic sensor(s) for directional analysis, microphones for aural analysis and tilt sensors for gathering elevations level working in conjunction with gaze detection techniques and devices.

The additional user device 113 may be a device that compliments the AR device 110 that is also operated by the user. In one exemplary embodiment, the additional user device 113 may be a mobile device while the AR device 110 is a headset worn by the user. The AR device 110 and the additional user device 113 may be connectable via a direct connection such as Bluetooth, and the additional user device 113 may provide complimentary information to the computer system 120 such as GPS information, or the like, while the AR device 110 provides more specific visual information to the computer system 120. The additional user device 113 may be a laptop computer, tablet, or any other device that is also operated by the user that may not be operated for the purposes of providing an AR experience to the user.

The additional data source 114 may be one or more data sources that are unrelated to the experience of the user. For example, the additional data source 114 may data sources from other historical users that may have also been in the same situation or location, or encountered the same problem as the user. The additional data sources 114 may be historical data sources that allow for the computer system 120 to create and update the ontology tree. The additional data sources 114 may provide the information needed for the computer system 120 to perform machine learning, natural language processing and create and modify artificial intelligence algorithms.

The network 107 is any group of two or more computer systems linked together. The network 107 may represent, for example, the Internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to each of the AR device 110, the surrounding object 111, the IOT device 112, the additional user device 113, and the additional data source 114 via the network 107.

Embodiments of the computer system 120 contemplated herein include a data repository 125 for storing information related to the augmented reality system 100. The data repository 125 may be a secured high-level storage server configured to store private user information related to the AR device 110, the surrounding object 111, the IOT device 112, the additional user device 113, and the additional data source 114.

Embodiments of the computer system 120 include a module structure 130 that includes a receiving and transmitting module 131, a capturing module 132, an analyzing module 133, a machine learning module 134, a transmitting module 135 and an AR overlay module 136. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 include one or more components of hardware and/or software program code for obtaining, retrieving, collecting, or otherwise receiving information from the AR device 110, the surrounding object 111, the IOT device 112, the additional user device 113, and the additional data source 114. For example, the receiving and transmitting module 131 may be configured to receive location, environmental, historical, video, or AR information from the various information sources in the augmented reality system 100. The receiving module 131 may be configured to pre-process this received information and provide this information to the appropriate modules and/or data storage locations, such as the data repository 125.

Referring still to FIG. 1, embodiments of the computer system 120 shown further include a capturing module 132. Embodiments of the capturing module 132 include one or more components of hardware and/or software program code configured for capturing, rendering or otherwise analyzing captured user interactions with the surroundings of a user. The capturing module 132 may take the video and/or images taken by the AR device 110 and process this video and/or image information so that the rest of the module structure 130 may utilize this information in the performance of machine learning, natural language processing and/or create and modify artificial intelligence algorithms related to finding and providing AR tutorials to users.

Embodiments of the computer system 120 shown further include an analyzing module 133. Embodiments of the analyzing module 133 include one or more components of hardware and/or software program code configured for analyzing captured information for making determinations. For example, the analyzing module 133 may be configured to determine a context of a user interaction based on at least one of machine learning technology, natural language processing techniques and artificial intelligence algorithms. The analyzing module 133 may be configured to perform the analysis required to determine the context or situation a user is in, based on the information received by the receiving module, and based on the historical information received by the data repository 125 and maintained by the machine learning module 134. Thus, the analyzing module 133 may be in operable communication with, and use information generated by, the machine learning module 134 described in more detail herein below. The analyzing module 133 may further be configured to determine which tutorial of a plurality of tutorials stored in the data repository 125 and/or the ontology tree is the relevant tutorial that a user would be interested in. The analyzing module 133 may be configured to perform the various logical determinations required to arrive at the best resulting AR tutorial for a given user situation.

Embodiments of the computer system 120 further includes a machine learning module 134. The machine learning module 134 may include one or more components of hardware and/or software program code configured for using machine learning, natural language processing and/or AI algorithms to help facilitate the analyzing module 133 make determinations as to which AR tutorials would apply to given user situation. The machine learning module 134 may be configured to receive and analyze feedback provided by users after the computer system 120 provides recommended tutorials. In the case that feedback is negative (i.e. the user provides an indication that the recommended AR tutorial was inappropriate or not a correct match), the machine learning module 134 may be configured to store this inaccuracy indication as feedback and use the received and stored inaccuracy indication to retrain a machine learning ontology tree. In some cases, more than a single negative feedback may be required before the machine learning module 134 changes the machine learning ontology tree. Thus, the feedback provided by users may be stored, and associated with any other information gathered about the user experience at the time the feedback was provided. The machine learning module 134 may be configured to facilitate the analyzing module 133 in identifying the next relevant AR tutorial that might be a match, in the event that the first recommendation receives negative feedback. The machine learning module 134 may likewise be configured to store and analyze positive feedback about recommended tutorials, and their associated user experiences.

Referring still to FIG. 1, the computer system 120 further includes a transmitting module 135. Embodiments of the transmitting module 135 include one or more components of hardware and/or software program code configured for transmitting information to the AR device 110 and/or the additional user device 113. This information may be related to instructions, requests for feedback on a given AR tutorial recommendation, or the like. The transmitting module 135 may further be configured to transmit the AR overlay that is generated by the AR overlay module 136 (described herein below) to the AR device 110 of the user.

The computer system 120 further includes an AR overlay module 136. Embodiments of the AR overlay module 136 include one or more components of hardware and/or software program code configured for overlaying a detected and/or recommended relevant tutorial on the augmented reality view port or AR device 110 of the user. The AR overlay module 136 may be configured to obtain the recommended AR tutorial as determined by the analyzing module 133 and/or the machine learning module 134, and further obtain the images captured by the AR device 110 in order to overlay the particular AR tutorial into the vision field of the user via the view port (e.g., screen, lenses, etc.) of the AR device 110.

Referring still to FIG. 1, embodiments of the computer system 120 may be equipped with a memory device 142 which may store information being used by the transaction serve 130 of the computer system 120. The computer system 120 may further be equipped with a processor 141 for implementing the tasks associated with the on-demand personal hotspot system 100 and perform processing associated with the functionality of the transaction server 130.

Figure 2:
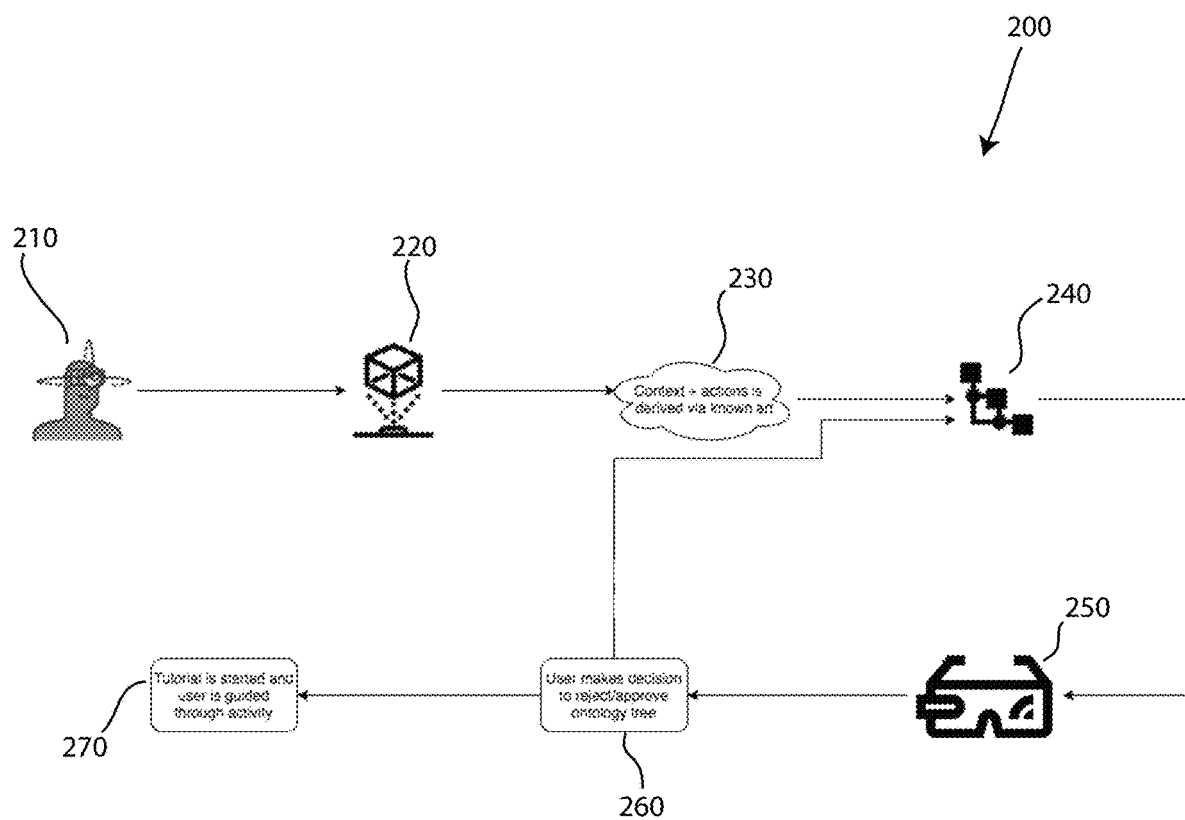
FIG. 2 depicts a workflow of the augmented reality system of FIG. 1, in accordance with embodiments of the present invention.

FIG. 2 depicts a workflow 200 of the augmented reality system of FIG. 1, in accordance with embodiments of the present invention. The workflow 200 includes a first step 210. At the first step 210, a user is wearing an AR device, such as the AR device 110. At a second step 220, the AR device captures a user interaction. At this step, surrounding objects and surrounding JOT device feeds may further be captured and provided to a computer system such as the computer system 120. At a third step 230, the computer system 120 performs an analysis on the user situation, which derives context and actions being taken by the user based on a review of historical information and interactions previously recorded by the computer system 120. With this analysis, the computer has an understanding of the context of the user's situation and this situation or user context is fed into an ontology tree at a step 240. The ontology tree analysis performed at step 240 results in the computer system determining a most likely or relevant AR tutorial that the user would be interested in viewing. At a step 250, the computer system provides this most likely or relevant AR tutorial to the user's AR device. The system may further request that the user provide feedback on whether the provided AR tutorial was helpful or appropriate. The user provides feedback to this request at a step 260. If the user approves this tutorial, the workflow 200 proceeds to a final step 270 of providing the fully approved tutorial to the user. If the user states that the recommended AR tutorial is unwanted or inappropriate, the workflow 200 proceeds back to step 240 in which the ontology tree is updated with the negative feedback and another tutorial may be found and recommended to the user.

Figure 3:
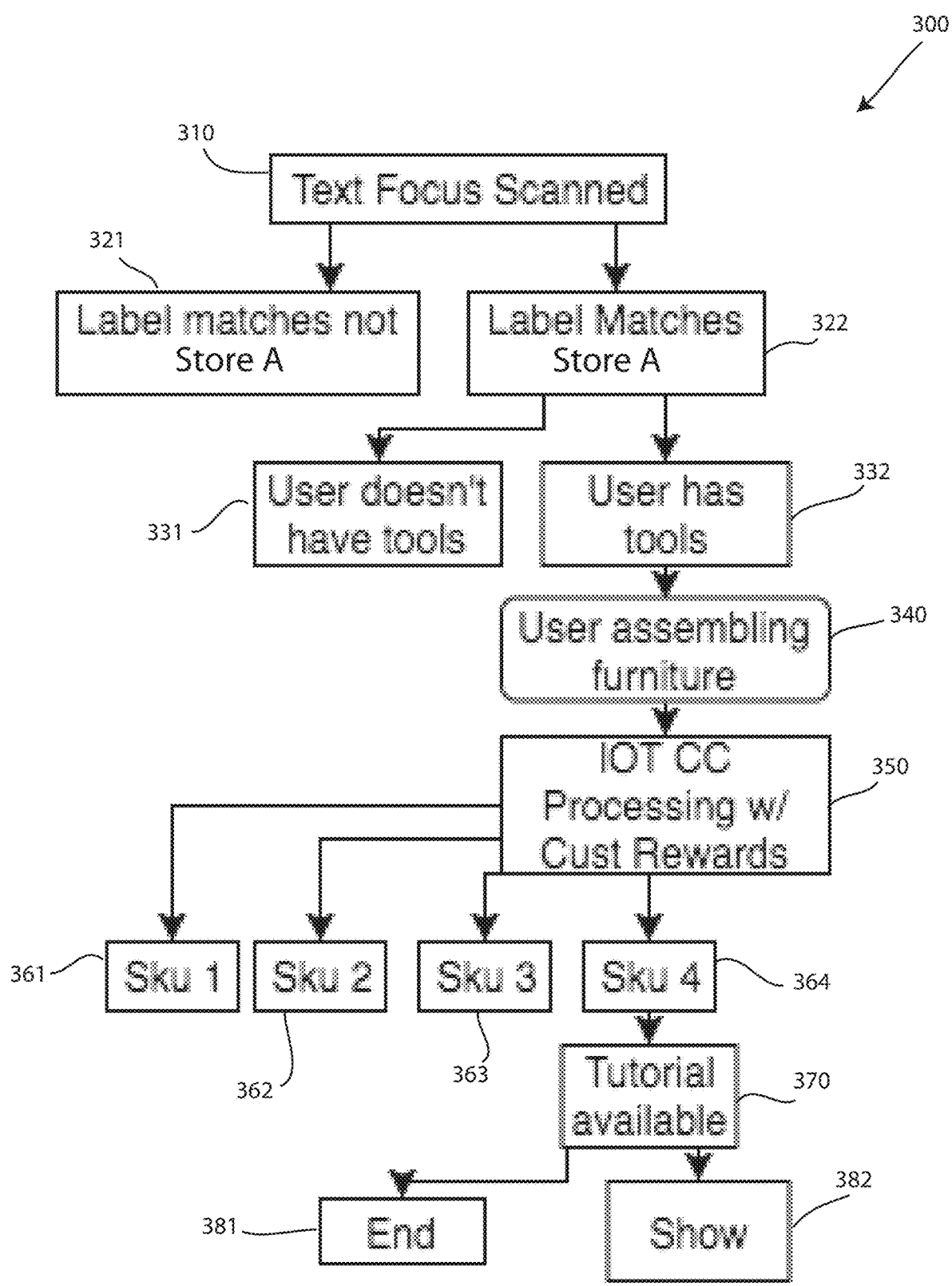
FIG. 3 depicts an ontology tree of an augmented reality tutorial method performable by the augmented reality system of FIG. 1, in accordance with embodiments of the present invention.

FIG. 3 depicts an ontology tree 300 of an augmented reality tutorial method performable by the augmented reality system of FIG. 1, in accordance with embodiments of the present invention. The ontology tree 300 may pertain to an augmented reality tutorial method, such as the method described and shown in FIGS. 4A-4B. The ontology tree 300 includes a first step 310 of focusing on the text or image of an unopened purchased item. The ontology tree 300 includes a step 321 of determining that the label does not match a product from a particular retailer Store A. Alternatively, the ontology 300 includes a step 322 of determining that the label does match a product from Store A. Store A may be a store that has developed a partnership with the AR system 100 and the computer system 120 thereof, or may own and operate the AR system 100 and the computer system 120 thereof. If the ontology tree determines that the product is from Store A (i.e. a tutorial from the computer system 120 is available), the ontology tree 300 includes a steps 331, 332 of determining that the user does not, or does, have the proper tools in the user vicinity to perform the appropriate tutorial. If the user has the appropriate tools, the ontology tree 300 moves on to a step 340 that notifies the user that a tutorial is available to assist the user in assembling the furniture. The system may determine that the user recently made a credit card payment for the particular good and/or this information may be located in the customer's account. This information may be provided to the computer system at step 350. This may provide confirmation to the system as to the particular item purchased. At steps 361, 362, 363, 364, the user may scan the particular UPC or SKU of the product purchased. At a step 370, the ontology tree 300 confirms that a tutorial is available for a particular SKU 364 and/or the item purchased. From here, the user is shown the tutorial at a step 382. The ontology tree ends at a step 381.

Figure 4A:
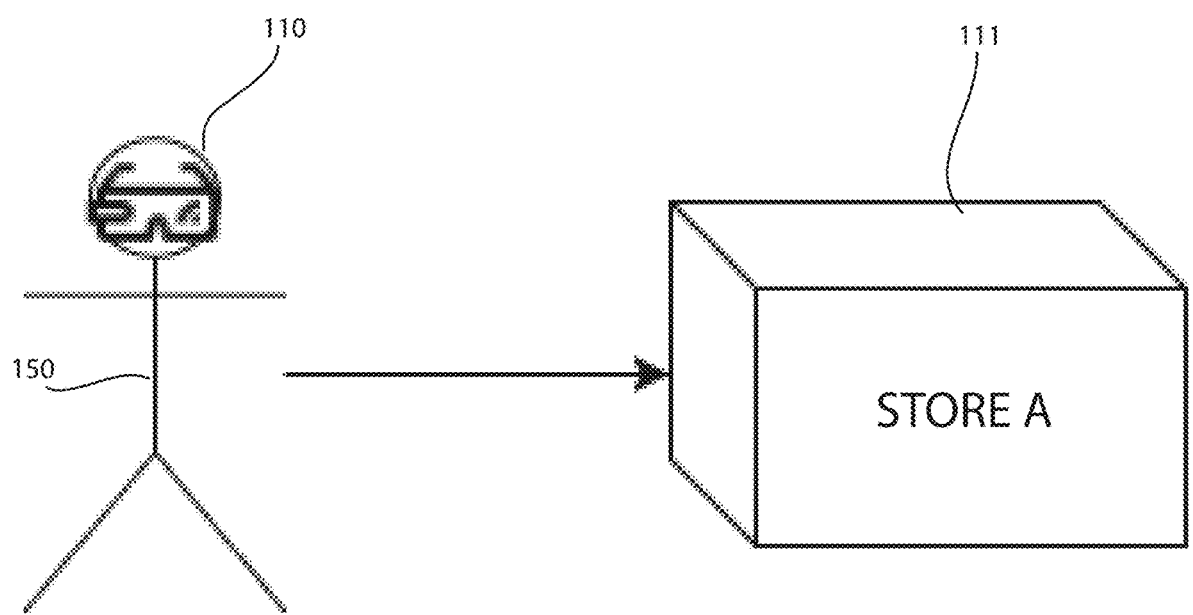
FIG. 4A depicts a first step of the augmented reality tutorial method of FIG. 3, in accordance with embodiments of the present invention.
Figure 4B:
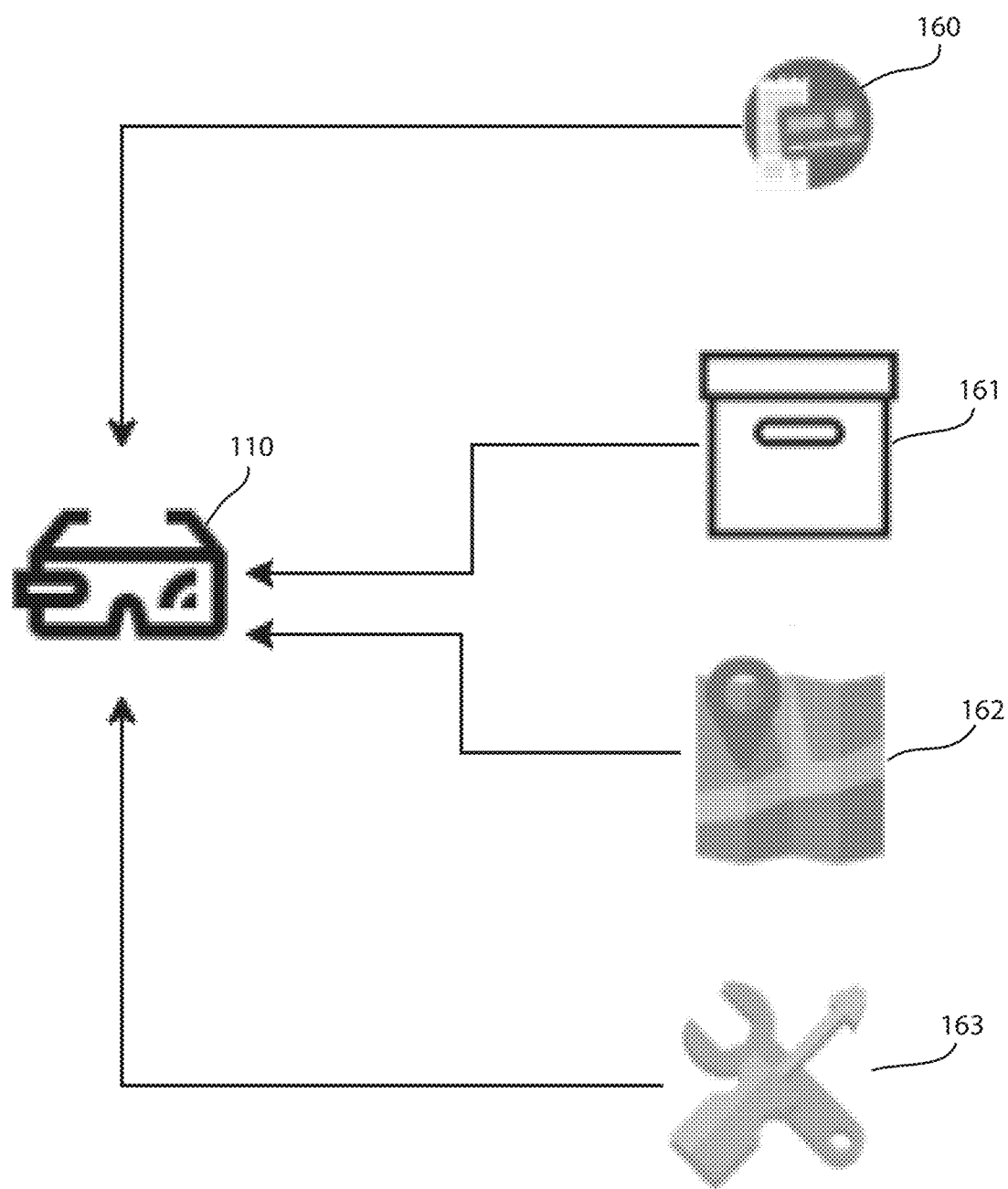
FIG. 4B depicts a second step of the augmented reality tutorial method of FIG. 3, in accordance with embodiments of the present invention.
Figure 4C:
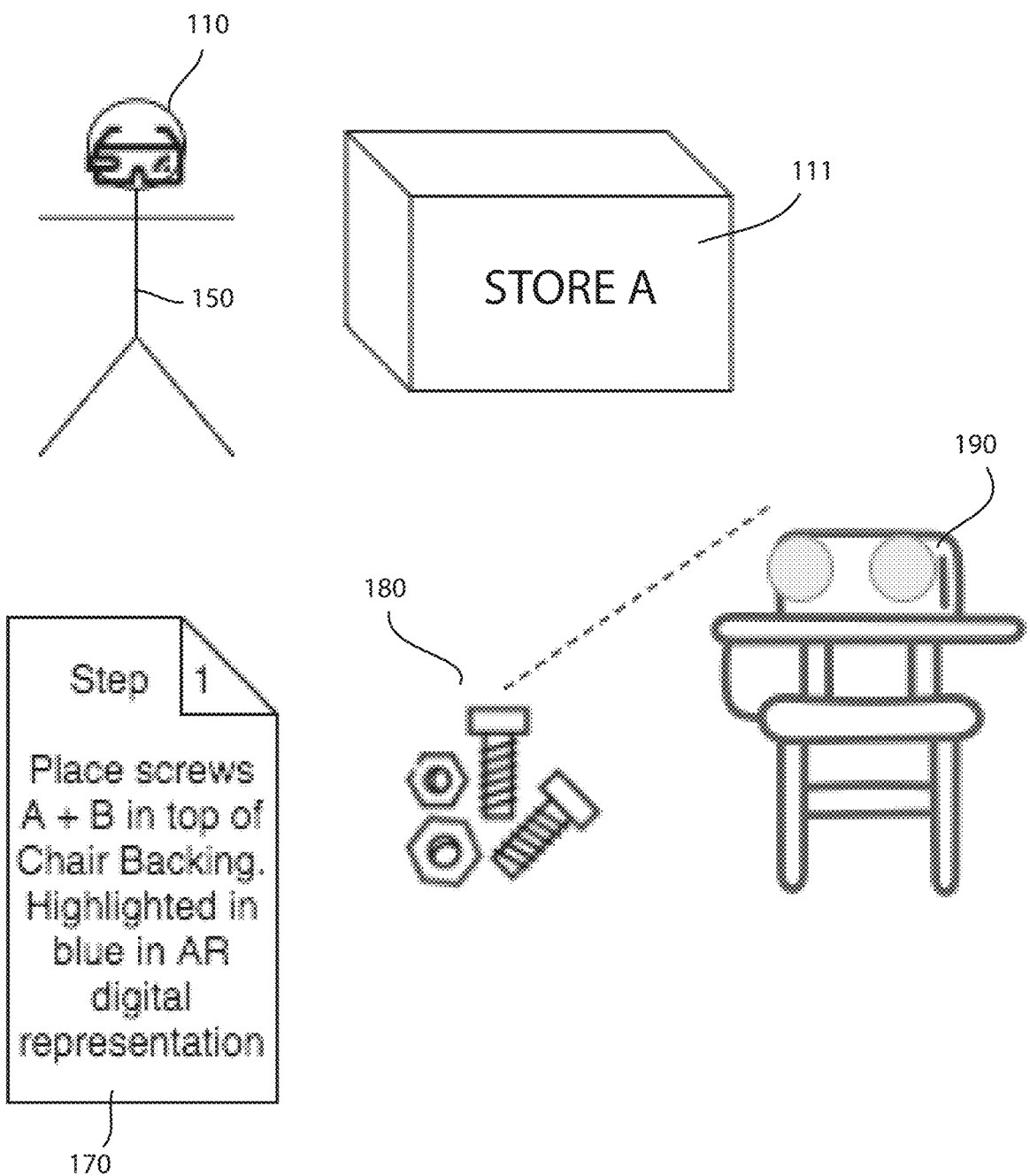
FIG. 4C depicts a third step of the augmented reality tutorial method of FIG. 3, in accordance with embodiments of the present invention.

FIG. 4A depicts a first step of the augmented reality tutorial method of FIG. 3, in accordance with embodiments of the present invention. FIG. 4A depicts a user 150 wearing the AR device 110 and looking at a new unopened item, surrounding object 111, purchased from Store A. The ontology tree 300 may begin proceeding and determining whether this purchased item 111 is from the participating Store A. FIG. 4B depicts a second step of the augmented reality tutorial method of FIG. 3, in accordance with embodiments of the present invention. At this step, various information is gathered by the AR device 110 and/or additional user device 113 and/or the IOT device 112. In this embodiment, the AR device 110 may be the device that is connected to the computer system 120. The AR device 110 may be connected via blue tooth to the TOT device 112 and/or the additional user device 113. Thus, the information gathered and collected by the other devices may be provided to the computer system 120 through the AR devices. However, this is only one embodiment, and in other embodiments a mobile phone or other additional user device 113 may be fed information and may forward the feed information to the computer system 120. As shown, an JO T device 112 provides information 160 related to the credit card transaction of the user 150 purchasing the item M. Further, the AR device 110 is configured to scan the label on the box of the item 111 purchased and provide this information 161 to the computer system. Further, geolocation (GPS) information 162 may be acquired an additional user device 113 such as a cell phone, which confirms that the user 150 recently went shopping at Store A. Still further, image recognition information 163 of available tools occurs by the AR device 110. FIG. 4C depicts a third step of the augmented reality tutorial method of FIG. 3, in accordance with embodiments of the present invention. The user 150 now is provided with the AR tutorial for assembling the item 111. The user 150 has the appropriate hardware 180 to perform the tutorial. Steps 170 are provided by the tutorial to assist or facilitate the user in assembling the item. Ultimately, the user 150 is able to complete the assembly to build a chair 190 efficiently, with the help of the AR tutorial.

Other embodiments are also contemplated in addition to that which is shown in FIGS. 4A-4C. For example, in one embodiment, a user is trying to turn on their computer when the monitor of the computer is turned off. The user does not understand why the computer is not working. The user may have an AR device such as an AR camera that captures the user wiggling the mouse and tapping the keyboard—two actions that are indicative of someone trying to start a computer. The computer system 120 receives this environmental or user experience information from the AR camera and pulls, via an ontology tree of derived actions and intents, a recommended tutorial. The computer system 120 may then prompt the user with a notification and highlights, via AR, the components for the user to interact with from the tutorial via an AR overlay on the AR device being worn by the user.

In another embodiment, a user is in a confused and bewildered state gazing at a vending machine and trying to understand its functionality. The computer system 120 may have stored historical information on the user's past interactions with other vending machines. The computer system 120 may determine that the user has a basic understanding of some vending machines, and may tailor the AR tutorial based on the user's known knowledge level of vending machines in general. If instead it is determined that the user has no previous known experience with a vending machine, a more comprehensive tutorial may be suggested to the user.

In a third example, the computer system 120 knows that a user has recently assembled a shoe rack that had nine pieces and was made of bamboo. Despite using an AR tutorial, the computer system 120 also knows that the user had to re-assemble parts of the shoe rack because there were specific front legs and back legs, which was not immediately obvious to the user because of a poor lighting. Through the machine learning system, when the next user that assembles the same shoe rack using the same tutorial, the tutorial can be updated in order to notify the next user of the differences in structure between the front and back legs. For example, the AR tutorial may highlight the front legs as having one color and the back legs as having another. Alternatively, the AR tutorial may overlay highlighted differences in structure—i.e. a slightly rounder edge on the front legs that are more square cut on the back.

In a fourth example, a user may be looking at a car engine. The computer system 120 may be provided with images of the car engine as viewed by the AR device being worn by the user. The computer system 120 may further be aware that the user recently bought a bottle of motor oil recently from a store. Further, the computer system 120 may determine that the user is holding the bottle of motor oil. Still further, the computer system 120 may determine that the user is fiddling with an oil dip stick. The computer system may also know the type of vehicle that the user is working on based on historical ownership information, or based on an analysis of the image of the engine itself currently being viewed. The computer system 120 may thus be configured to find the proper tutorial for how to change the oil on the particular model of vehicle and overlay instructions into the user's AR device and highlight components of the engine that need to be interacted with.

The AR system 100 and computer system 120 may be configured to activate passively and may be auto searching for tutorials based on the video or image information captured by the AR device when worn and activated by the user. This captured image information may be supplemented by other IOT devices, such as audio or video sources. Visual recognition of a user interaction, location or environment may be conducted using machine learning analysis. Further, text or language processing may be used to determine the context, as well as audio or speech analysis. The ontology tree of the computer system 120 may be continually determining whether a user is actively taking steps associated with failure or frustration of the user's current context, action or situation. The AR system 100 and computer system 120 may attempt to match and/or find tutorials in real time to match a user's context, action or situation. If a frustration threshold is violated, the AR system 100 may be configured to provide a recommended tutorial. In other embodiments, the AR system 100 may be configured to provide any tutorials that the AR system 100 deems relevant to a given user context, action or situation. Thus, tutorials may be actively shown, passively shown, or may be based on a user's frustration level as determined by various input information. A success rate computation may be maintained by the computer system 120 for a given tutorial associated with a given context, action or situation. The success rate computation may be based on user feedback from recommended tutorials. A feedback enabled loop may create a dynamically changing user profile for each user with the user of reinforcement learning. The computer system 120 may be maintaining this analysis engine running through the module structure 130 while the AR device 110 includes a temporary cache of the necessary information to process the analysis.

Figure 5:
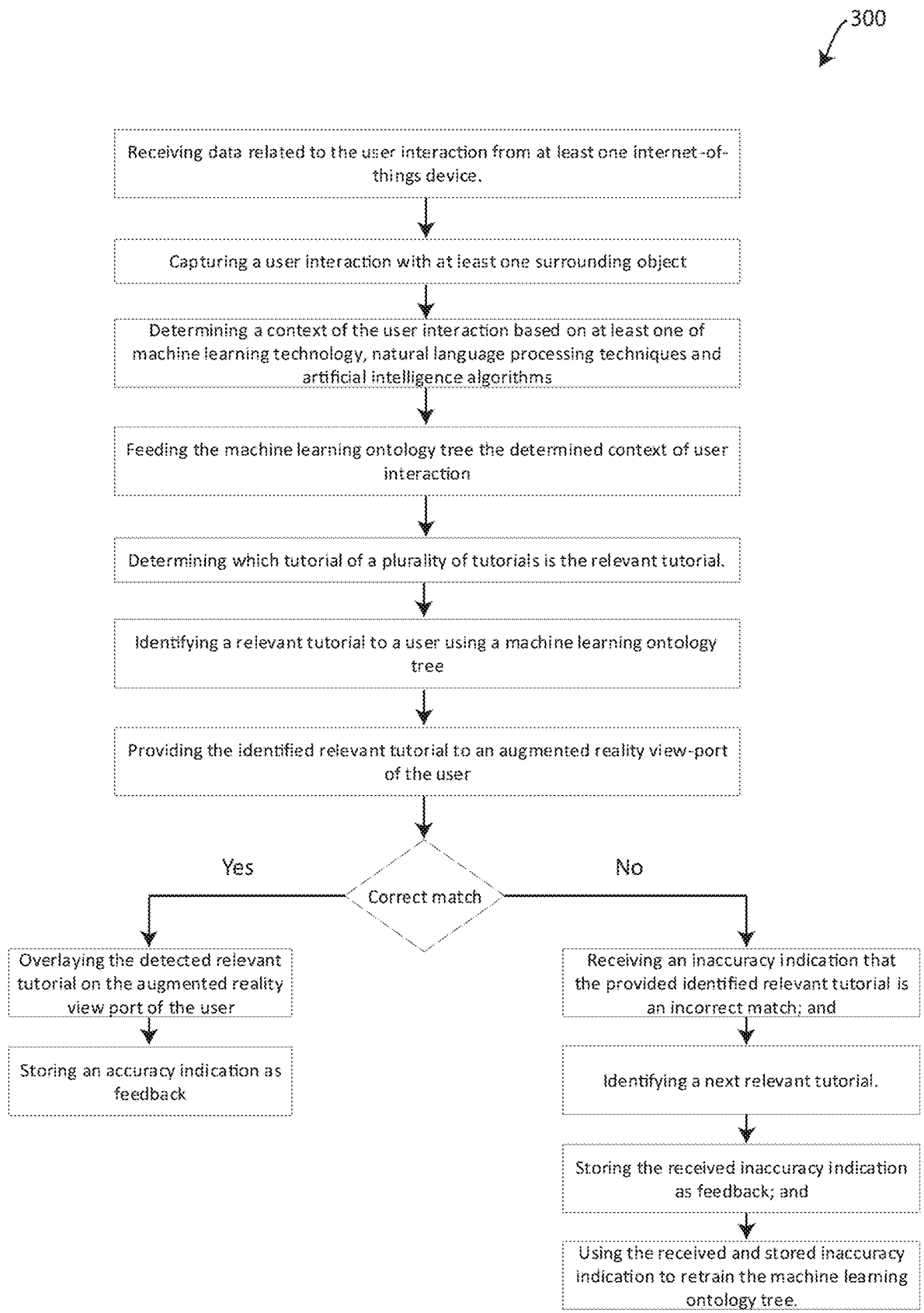
FIG. 5 depicts a flow chart of another augmented reality method performable by, the augmented reality system of FIG. 1, in accordance with embodiments of the present invention.

FIG. 5 depicts a flow chart of another augmented reality method 300 performable by the augmented reality system 100 of FIG. 1, in accordance with embodiments of the present invention. The method 300 includes a first step 302 of receiving data related to the user interaction from at least one internet-of-things device. The method 300 includes a next step 304 of capturing a user interaction with at least one surrounding object. The method 300 includes a next step 306 of determining a context of the user interaction based on at least one of machine learning technology, natural language processing techniques and artificial intelligence algorithms. The method 300 includes a further step 308 of feeding the machine learning ontology tree the determined context of user interaction. The method 300 includes a next step 310 of determining which tutorial of a plurality of tutorials is the relevant tutorial. Still further, the method 300 includes a step 312 of identifying a relevant tutorial to a user using a machine learning ontology tree and a step 314 of providing the identified relevant tutorial to an augmented reality device of the user. At a step 316, the method includes determining whether a correct match exists. If the answer is "yes", the method 300 includes a step 318 of overlaying the detected relevant tutorial on the augmented reality view port of the user and a step 320 of storing an accuracy indication as feedback. If the answer is "no," the method 300 includes a step 322 of receiving an inaccuracy indication that the provided identified relevant tutorial is an incorrect match, followed by a step 324 of identifying a next relevant tutorial, a step 326 of storing the received inaccuracy indication as feedback, and a step 328 of using the received and stored inaccuracy indication to retrain the machine learning ontology tree.

Figure 6:
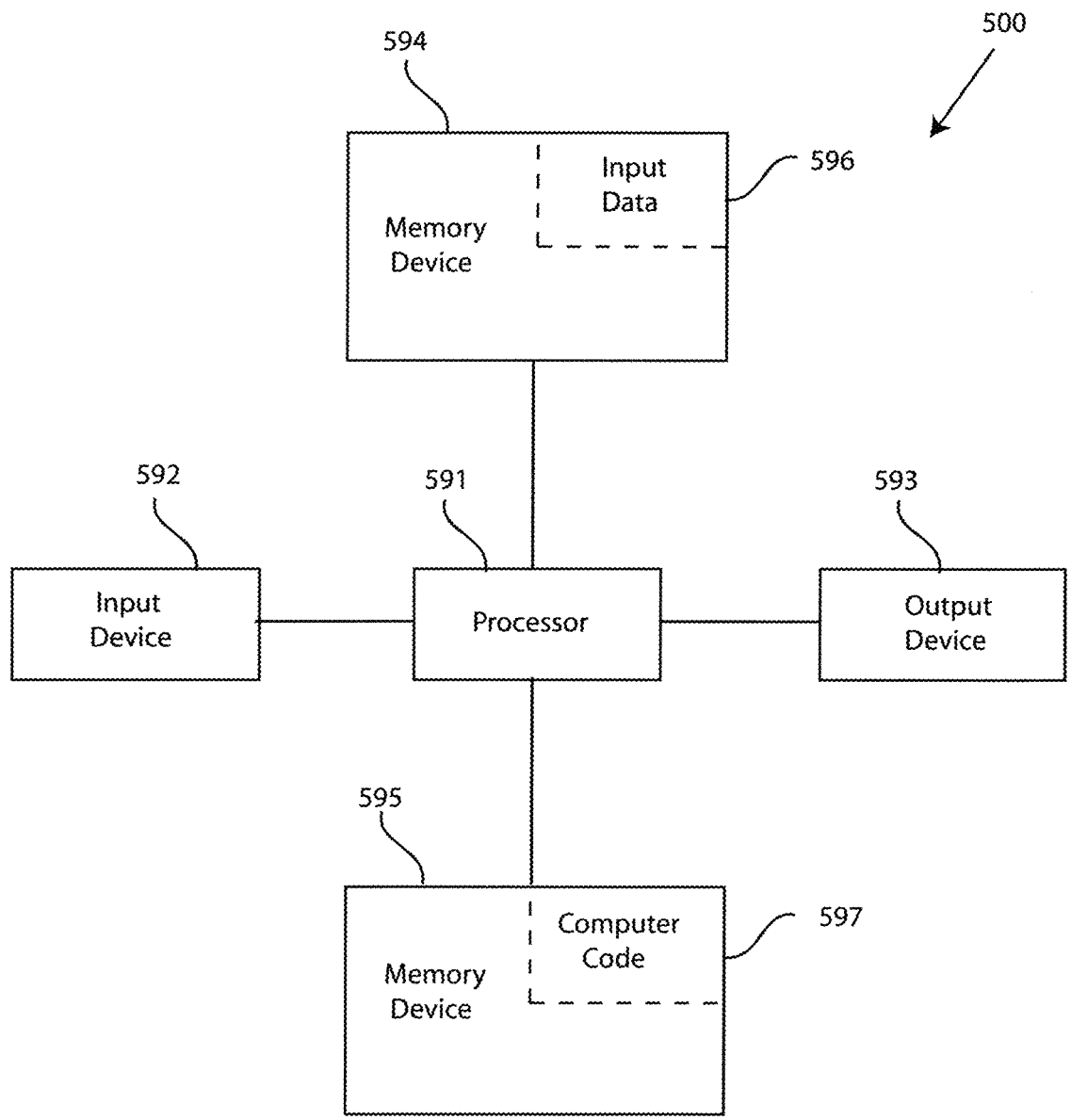
FIG. 6 depicts a block diagram of a computer system of the augmented reality system of FIG. 1, capable of implementing methods for providing augmented reality tutorials in FIG. 3-5, in accordance with embodiments of the present invention.

FIG. 6 illustrates a block diagram of a computer system that may representative of any computer or computer system within the augmented reality system 100 of FIG. 1, capable of implementing augmented reality methods of FIGS. 2-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing augmented reality methods; in the manner prescribed by the embodiments of FIG. 2-5 using the augmented reality system 100 of FIG. 1, wherein the instructions of the computer code 597 may be executed by processor 591 via memory device 595. The computer code 597 may include software or program instructions that may implement one or more algorithms for implementing the augmented reality methods, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and augmented reality methods. Thus, an embodiment of the present invention discloses a process for supporting computer infrastructure, where the process includes providing at least one support service for at least one of integrating, hosting, maintaining and deploying computer-readable code (e.g., computer code 597) in a computer system (e.g., computer system 500) including one or more processor(s) 591, wherein the processor(s) carry out instructions contained in the computer code 597 causing the computer system to provide an augmented reality system. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements augmented reality methods. Thus, the present invention discloses a process for supporting, deploying and/or integrating computer infrastructure, integrating, hosting, maintaining, and deploying computer-readable code into the computer system 500, wherein the code in combination with the computer system 500 is capable of performing augmented reality methods.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MID), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically, assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate, Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
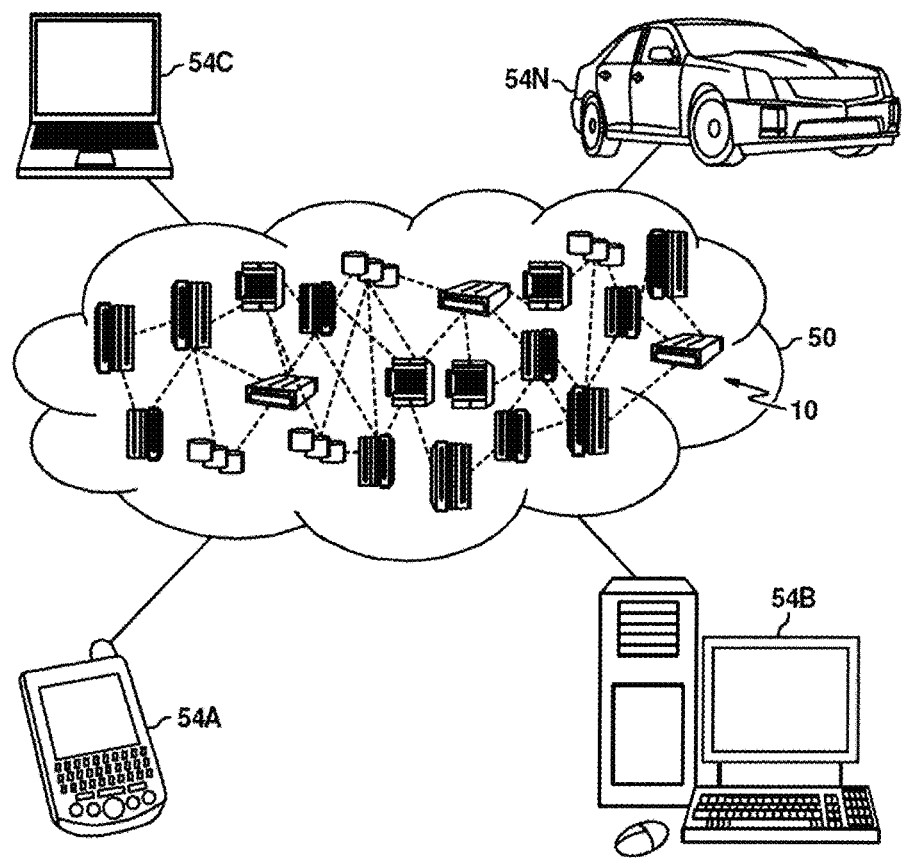
FIG. 7 depicts a cloud computing environment, in accordance with embodiments of the present invention.
Figure 8:
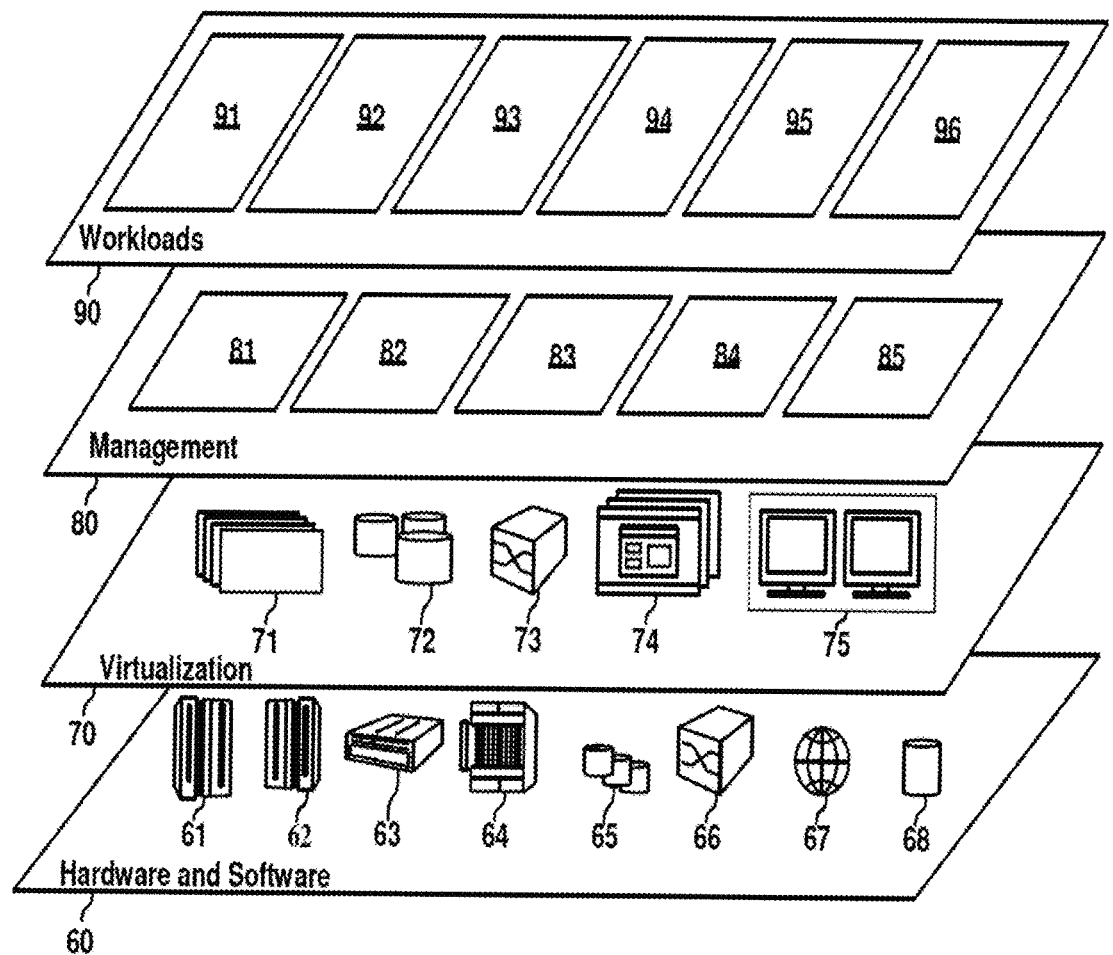
FIG. 8 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to providing augmented reality tutorials 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   capturing, by the one or more processors of the computer system, a user interaction with at least one surrounding object;
   determining, by the one or more processors of the computer system, a context of the user interaction based on machine learning technology, wherein the determining the context includes determining whether a user is actively taking steps associated with failure or frustration, wherein the context includes a contextual situation, including visual recognition of a location or environment; and
   feeding, by the one or more processors of the computer system, a machine learning ontology tree the determined context of user interaction;
   identifying, by one or more processors of a computer system, a relevant tutorial to a user using the machine learning ontology tree in real time to match the determined context of the user interaction based on a frustration level of the user, wherein the relevant tutorial has been updated by the machine learning technology based on a previous user interaction to determine differences in structure between structural components to be interacted with by the user;

providing, by the one or more processors of the computer system, the identified relevant tutorial to an augmented reality device of the user;

overlaying, by the one or more processors of the computer system, the detected relevant tutorial on the augmented reality device of the user; and highlighting, by the one or more processors of the computer system, the structural components to be interacted with by the user and the differences in structure during the detected relevant tutorial on the augmented reality device of the user.

2. The method of claim 1, wherein the capturing further comprises:

receiving, by the one or more processors of the computer system, data related to the user interaction from at least one internet-of-things device, wherein the data includes inputs gathered by the internet-of-things device associated with determining user gestures.

3. The method of claim 1, wherein the identifying further comprises:

determining, by the one or more processors of the computer system using the machine learning ontology tree based the determined context, which tutorial of a plurality of tutorials is the relevant tutorial.

4. The method of claim 1, further comprising:

receiving, by the one or more processors of the computer system, an inaccuracy indication that the provided identified relevant tutorial is an incorrect match; and identifying, by the one or more processors of the computer system, a next relevant tutorial.

5. The method of claim 4, further comprising;

storing, by the one or more processors of the computer system, the received inaccuracy indication as feedback; and using, by the one or more processors of the computer system, the received and stored inaccuracy indication to retrain the machine learning ontology tree.

6. The method of claim 1, wherein the determining the context includes determining, by the one or more processors of a computer system, that a frustration threshold is violated.

7. A computer system, comprising:

one or more processors;

one or more memory devices coupled to the one or more processors; and one or more computer readable storage devices coupled to the one or more processors, wherein the one or more storage devices contain program code executable by the one or more processors via the one or more memory devices to implement a method, the method comprising:

capturing, by the one or more processors of the computer system, a user interaction with at least one surrounding object;

determining, by the one or more processors of the computer system, a context of the user interaction based machine learning technology, wherein the determining the context includes determining whether a user is actively taking steps associated with failure or frustration, wherein the context includes a contextual situation, including visual recognition of a location or environment;

feeding, by the one or more processors of the computer system, a machine learning ontology tree the determined context of user interaction;

identifying, by the one or more processors of the computer system, a relevant tutorial to a user using the machine learning ontology tree in real time to match the determined context of the user interaction based on a frustration level of the user, wherein the relevant tutorial has been updated by the machine learning technology based on a previous user interaction to determine differences in structure between structural components to be interacted with by the user;

providing, by the one or more processors of the computer system, the identified relevant tutorial to an augmented reality device of the user;

overlaying, by the one or more processors of the computer system, the detected relevant tutorial on the augmented reality device of the user; and highlighting, by the one or more processors of the computer system, the structural components to be interacted with by the user and the differences in structure during the detected relevant tutorial on the augmented reality device of the user.

8. The computer system of claim 7, wherein the capturing further comprises:

receiving, by the one or more processors of the computer system, data related to the user interaction from at least one internet-of-things device, wherein the data includes inputs gathered by the internet-of-things device associated with determining user gestures.

9. The computer system of claim 7, wherein the identifying further comprises:

determining, by the one or more processors of the computer system using the machine learning ontology tree based on the determined context, which tutorial of a plurality of tutorials is the relevant tutorial.

10. The computer system of claim 7, the method further comprising:

receiving, by the one or more processors of the computer system, an inaccuracy indication that the provided identified relevant tutorial is an incorrect match; and identifying, by the one or more processors of the computer system, a next relevant tutorial.

11. The computer system of claim 10, the method further comprising:

storing, by the one or more processors of the computer system, the received inaccuracy indication as feedback; and using, by the one or more processors of the computer system, the received and stored inaccuracy indication to retrain the machine learning ontology tree.

12. The computer system of claim 7, wherein the determining the context includes determining, by the one or more processors of a computer system, that a frustration threshold is violated.

13. A computer program product, comprising a computer readable hardware storage device storing a computer readable program code, the computer readable program code comprising an algorithm that when executed by one or more processors of a computer system implements a method, the method comprising:

capturing, by the one or more processors of the computer system, a user interaction with at least one surrounding object;

determining, by the one or more processors of the computer system, a context of the user interaction based on machine learning technology, wherein the determining the context includes determining whether a user is actively taking steps associated with failure or frustration, wherein the context includes a contextual situation, including visual recognition of a location or environment;

feeding, by the one or more processors of the computer system, a machine learning ontology tree the determined context of user interaction;

identifying, by the one or more processors of the computer system, a relevant tutorial to a user using the machine learning ontology tree in real time to match the determined context of the user interaction based on a frustration level of the user, wherein the relevant tutorial has been updated by the machine learning technology based on a previous user interaction to determine differences in structure between structural components to be interacted with by the user;

providing, by the one or more processors of the computer system, the identified relevant tutorial to an augmented reality device of the user;

overlaying, by the one or more processors of the computer system, the detected relevant tutorial on the augmented reality device of the user; and highlighting, by the one or more processors of the computer system, the structural components to be interacted with by the user and the differences in structure during the detected relevant tutorial on the augmented reality device of the user.

14. The computer program product of claim 13, wherein the capturing further comprises:

receiving, by the one or more processors of the computer system, data related to the user interaction from at least one internet-of-things device, wherein the data includes inputs gathered by the internet-of-things device associated with determining user gestures.

15. The computer program product of claim 13, wherein the identifying further comprises:

determining, by the one or more processors of the computer system using the machine learning ontology tree based on the determined context, which tutorial of a plurality of tutorials is the relevant tutorial.

16. The computer program product of claim 13, the method further comprising:

receiving, by the one or more processors of the computer system, an inaccuracy indication that the provided identified relevant tutorial is an incorrect match; and identifying, by the one or more processors of the computer system, a next relevant tutorial.

17. The computer program product of claim 16, the method further comprising;

storing, by the one or more processors of the computer system, the received inaccuracy indication as feedback; and using, by the one or more processors of the computer system, the received and stored inaccuracy indication to retrain the machine learning ontology tree.

18. The computer program product of claim 13, wherein the determining the context includes determining, by the one or more processors of a computer system, that a frustration threshold is violated.

* * * * *